United States Patent
Umemoto et al.

(10) Patent No.: US 11,939,222 B2
(45) Date of Patent: Mar. 26, 2024

(54) NANODIAMOND PARTICLE DISPERSION

(71) Applicant: DAICEL CORPORATION, Osaka (JP)

(72) Inventors: Kouichi Umemoto, Tokyo (JP); Hidekazu Takeuchi, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 910 days.

(21) Appl. No.: 16/965,418

(22) PCT Filed: Jan. 15, 2019

(86) PCT No.: PCT/JP2019/000969
§ 371 (c)(1),
(2) Date: Jul. 28, 2020

(87) PCT Pub. No.: WO2019/146453
PCT Pub. Date: Aug. 1, 2019

(65) Prior Publication Data
US 2021/0114882 A1    Apr. 22, 2021

(30) Foreign Application Priority Data
Jan. 29, 2018 (JP) .................. 2018-012137

(51) Int. Cl.
*C01B 32/28* (2017.01)
*B82Y 30/00* (2011.01)
*B82Y 40/00* (2011.01)
*C09C 1/44* (2006.01)
*C09C 3/12* (2006.01)

(52) U.S. Cl.
CPC .............. *C01B 32/28* (2017.08); *C09C 1/44* (2013.01); *C09C 3/12* (2013.01); *B82Y 30/00* (2013.01); *B82Y 40/00* (2013.01); *C01P 2004/64* (2013.01)

(58) Field of Classification Search
None
See application file for complete search history.

(56) References Cited

U.S. PATENT DOCUMENTS

| 6,187,069 B1 * | 2/2001 | Hoshi | B24D 3/28 51/296 |
| 2010/0233371 A1 * | 9/2010 | Kim | F02F 3/10 525/104 |
| 2016/0233825 A1 * | 8/2016 | Bertelo | H01L 31/054 |

FOREIGN PATENT DOCUMENTS

| JP | 2014-12803 A | 1/2014 |
| JP | 2015-219125 A | 12/2015 |
| JP | 2017-128482 A | 7/2017 |
| WO | 2020/095581 A1 | 5/2020 |

OTHER PUBLICATIONS

Machine translation of Yamakawa JP 2015219125 (Year: 2015).*
Welker (Basics and Sampling of Particles for Size Analysis and Identification). (Year: 2012).*
Extended European Search Report for European Application No. 19743199.2, dated Sep. 24, 2021.
Hajiali et al., "Silane functionalization of nanodiamond for polymer nanocomposites-effect of degree of silanization," Colloids and Surfaces A: Physicochemical and Engineering Aspects, vol. 506, 2016 (Published on Jun. 18, 2016), pp. 254-263.
An, X. and Z. Hanmin, "Surface Functionalized of Nanodiamonds," Chinese Journal of Reactive Polymers (2002), vol. 11, No. 2, pp. 152-156.
International Search Report dated Apr. 16, 2019, in PCT/JP2019/000969.
Krueger et al., "Biotinylated Nanodiamond: Simple and Efficient Functionalization of Detonated Diamond," Langmuir (2008), vol. 24, pp. 4200-4204.
Written Opinion of the International Searching Authority dated Apr. 16, 2019, in PCT/JP2019/000969.

* cited by examiner

*Primary Examiner* — Robert T Butcher
(74) *Attorney, Agent, or Firm* — Birch, Stewart, Kolasch & Birch, LLP

(57) ABSTRACT

A nanodiamond particle dispersion including nanodiamond particles highly dispersed in an organic solvent is provided. A nanodiamond particle dispersion of the present invention includes nanodiamond particles dispersed in an organic solvent, in which the nanodiamond particles have a silane compound (excluding a silane compound having a (meth) acryloyl group) bonded to a surface of the nanodiamond particles, the organic solvent has an SP value from 8.0 to 14.0 $(cal/cm^3)^{1/2}$, and the nanodiamond particles are dispersed with a particle diameter (D50) from 2 to 100 nm. The organic solvent is preferably at least one type of organic solvent selected from ketones, ethers, alcohols, and carbonates.

13 Claims, 1 Drawing Sheet

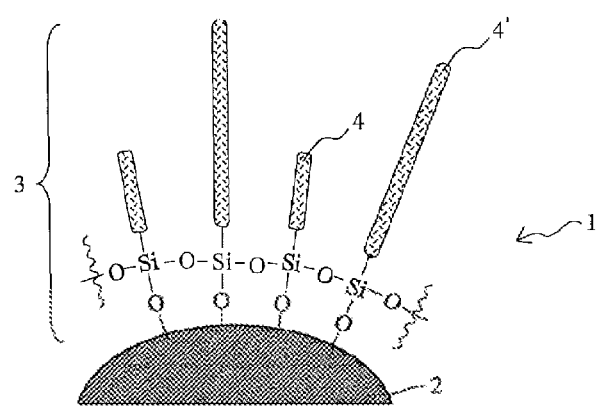

NANODIAMOND PARTICLE DISPERSION

TECHNICAL FIELD

The present invention relates to a nanodiamond particle dispersion including nanodiamond particles highly dispersed in a polar organic solvent. The present application claims the rights of priority of JP 2018-012137 filed in Japan on 29 Jan. 2018, the content of which is incorporated herein.

BACKGROUND ART

Nano-sized fine substances are known to have novel characteristics that cannot be achieved in a bulk state. For example, nanodiamond particles (i.e. nano-sized diamond particles) exhibit mechanical strength, a high refractive index, thermal conductivity, insulating properties, antioxidation properties, and an action of promoting the crystallization of resins, and the like. However, nanodiamond particles typically have large proportions of surface atoms, a sum of van der Waals forces that can act between surface atoms of adjacent particles is strong, and aggregation tends to occur. In addition, in the case of nanodiamond particles, Coulomb interaction between crystalline surfaces of adjacent crystals may contribute to agglutination, which is a phenomenon where particles form a significantly firm cluster. Thus, it has been extremely difficult to disperse nanodiamond particles as primary particles in a polar organic solvent or resin. Therefore, the surface of nanodiamond particles are modified to thereby impart dispersibility to the nanodiamond particles in order to suppress aggregation.

For example, Patent Document 1 indicates that nanodiamond particles, a surface of which is modified by cations of a cationic surfactant exhibit excellent 30 dispersibility in toluene.

CITATION LIST

Patent Document
Patent Document 1: JP 2017-128482 A

SUMMARY OF INVENTION

Technical Problem

However, it was found that nanodiamond particles, the surface of which is modified by cations of a cationic surfactant, may not be dispersed but undergo aggregation in a polar organic solvent such as methyl ethyl ketone.

Therefore, an object of the present invention is to provide a nanodiamond particle dispersion having nanodiamond particles (may be referred to as "ND particles" in the present specification) highly dispersed in an organic solvent.

Solution to Problem

As a result of diligent research to solve the above problems, the present inventors discovered that ND particles having a silane compound bonded to the surface exhibit high dispersibility in a polar organic solvent without being aggregated because the silane compound acts as a steric hindrance. The present invention was completed based on these findings.

That is, the present invention provides a nanodiamond particle dispersion comprising nanodiamond particles dispersed in an organic solvent, in which the nanodiamond particles have a silane compound (excluding a silane compound having a (meth)acryloyl group) bonded to a surface of the nanodiamond particles, the organic solvent has an SP value from 8.0 to 14.0 $(cal/cm^3)^{1/2}$, and the nanodiamond particles are dispersed with a particle diameter (D50) from 2 to 100 nm.

The present invention also provides a nanodiamond particle dispersion according to claim 1, in which the nanodiamond particles having a silane compound (excluding a silane compound having a (meth)acryloyl group) 30 bonded to the surface are nanodiamond particles having a structure including the surface modified by a group represented by Formula (1):

[Chemical Formula 1]

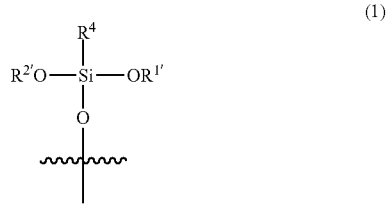

where, in Formula (1), $R^4$ denotes an aliphatic hydrocarbon group having from 1 to 8 carbon atoms, $R^{1'}$ and $R^{2'}$ may be the same or different, and are each a hydrogen atom, an aliphatic hydrocarbon group having from 1 to 3 carbon atoms, or a group represented by Formula (a), and the atomic bond indicated by the wavy line in the Formula bonds to the surface of the nanodiamond particles:

[Chemical Formula 2]

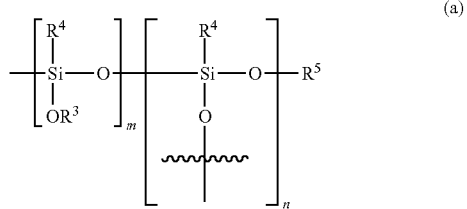

where, in Formula (a), $R^4$ is the same as above, $R^3$ and $R^5$ may be the same or different, and each denotes a hydrogen atom or an aliphatic hydrocarbon group having from 1 to 3 carbon atoms, m and n may be the same or different and each denotes an integer of 0 or greater, an atomic bond extending leftward from a silicon atom bonds to an oxygen atom, and an atomic bond indicated by a wavy line bonds to the surface of the nanodiamond particles.

The present invention also provides the nanodiamond particle dispersion, in which the organic solvent having an SP value from 8.0 to 14.0 $(cal/cm^3)^{1/2}$ is at least one organic solvent selected from ketones, ethers, alcohols, and carbonates.

Advantageous Effects of Invention

The ND particle dispersion of the present invention has a configuration in which the surface of the ND particles included in the ND particle dispersion is modified with a silane compound, and the part of the surface modification acts as a steric hindrance, thereby suppressing the aggregation of the ND particles, and thus the ND particles are highly dispersible.

Therefore, the ND particle dispersion of the present invention can be suitably used as an additive (for example, a mechanical strength imparting agent, a high refractive index imparting material, a thermal conductivity imparting material, an insulating property imparting material, an antioxidant, a crystallization accelerator, and a dendrite suppressing agent, etc.) that imparts to a resin and the like, the characteristics of the fine ND particles (for example, mechanical strength, high refractive index, thermal conductivity, insulating properties, antioxidation properties, and crystallization accelerating action), or as a friction-reducing agent or lubricant that is applied to a sliding part or the like of a mechanical component (such as, for example, an automobile or an aircraft).

BRIEF DESCRIPTION OF DRAWINGS

FIG. 1 is an enlarged schematic view illustrating an example of a surface-modified ND particle according to an embodiment of the present invention, wherein the surface-modified ND particle (1) has a short-chain aliphatic hydrocarbon group (4) and a long-chain aliphatic hydrocarbon group (4') as surface-modifying groups (3) on the surface of an ND particle (portion) (2).

DESCRIPTION OF EMBODIMENTS

Nanodiamond Particle Dispersion

The nanodiamond particle dispersion (ND particle dispersion) according to an embodiment of the present invention has a configuration in which ND particles (may be referred to as "surface-modified ND particles" in the present specification) having a silane compound (excluding those having a (meth)acryloyl group) bonded to the surface are dispersed in an organic solvent (in the present specification, may be referred to a "polar organic solvent") having an SP value of 8.0 to 14.0 $(cal/cm^3)^{1/2}$.

In the ND particle dispersion according to an embodiment of the present invention, the particle diameter (D50, median diameter) of the surface-modified ND particles is from 2 to 100 nm, preferably from 2 to 50 nm, more preferably from 2 to 40 nm, even more preferably from 2 to 30 nm, particularly preferably from 2 to 20 nm, and most preferably from 2 to 15 nm. Note that the particle diameter (D50) of the surface-modified ND particles according to an embodiment of the present invention can be measured by dynamic light scattering.

The concentration (solid content concentration) of the surface-modified ND particles in the ND particle dispersion is, for example, from 0.0001 to 10 mass %.

Therefore, the content of the solvent in the ND particle dispersion is, for example, from 90 to 99.9999 mass %, and the percentage of the polar organic solvent (if two or more types are included, then the total amount) in the total amount of the solvent is, for example, 60 mass % or greater, preferably 80 mass % or greater, and particularly preferably 90 mass % or greater.

The content of the surface-modified ND particles in the ND particle dispersion is, for example, from 0.0001 to 10 parts by mass, preferably from 0.01 to 8 parts by mass, and particularly preferably from 1 to 5 parts by mass, per 100 parts by mass of the polar organic solvent.

Furthermore, the ND particle dispersion according to an embodiment of the present invention may include only the surface-modified ND particles and polar organic solvent described above, or may contain one or more types of other components besides the surface-modified ND particles and the polar organic solvent described above. The content of such other components (in a case where two or more types are included, the total amount thereof) is, for example, 30 mass % or less, preferably 20 mass % or less, particularly preferably 10 mass % or less, most preferably 5 mass % or less, and especially preferably 1 mass % or less, based on the total amount of the ND particle dispersion. Therefore, the total content of the surface-modified ND particles and the polar organic solvent described above is, for example, 70 mass % or greater, preferably 80 mass % or greater, particularly preferably 90 mass % or greater, most preferably 95 mass % or greater, and especially preferably 99 mass % or greater, based on the total amount of the ND particle dispersion.

The ND particle dispersion according to an embodiment of the present invention can be suitably used, for example, as an additive for imparting the characteristics of fine ND particles (such as, for example, mechanical strength, high refractive index, thermal conductivity, insulating properties, antioxidation properties, crystallization promoting action, and dendrite suppressing action) to a resin or the like (such as, for example, photocurable resins and thermoplastic resins). In addition, a composition obtained by adding the ND particle dispersion according to an embodiment of the present invention to a resin can be suitably used, for example, as a material such as a functional hybrid material, a thermally functional (heat resistant, heat storing, thermo-electrically conductive, heat insulating, and the like) material, a photonic material (organic EL element, LED, liquid crystal display, optical disk, and the like), a bio/biocompatible material, a coating material, a film material (such as a hard coating film for a touchscreen, various displays, and the like, and a thermal barrier film), a sheet material, a screen material (such as a transmission type transparent screen), a filler material (such as fillers for heat radiation or for improving mechanical properties), a heat resistant plastic substrate material (such as a substrate for a flexible display), and a material for lithium ion batteries.

The ND particle dispersion according to an embodiment of the present invention can also be suitably used as a friction-reducing agent or a lubricant applied to a sliding part or the like of a mechanical component (such as, for example, an automobile or an aircraft).

Surface-Modified ND Particles

The surface-modified ND particles according to an embodiment of the present invention are ND particles having a silane compound (excluding those having a (meth) acryloyl group) bonded to the surface.

The silane compound is preferably a compound having a hydrolyzable group and an aliphatic hydrocarbon group, and not having a (meth)acryloyl group (=an acryloyl group or a methacryloyl group). A single silane compound can be used, or two or more types can be used in combination.

The surface-modified ND particle preferably includes, as the silane compound above, at least a compound represented by the following Formula (1-1):

[Chemical Formula 3]

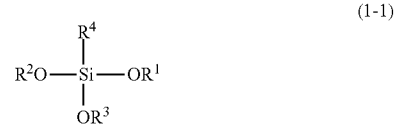

where $R^1$, $R^2$, and $R^3$ are the same or different, and each denotes an aliphatic hydrocarbon group having from 1 to 3 carbon atoms, and $R^4$ denotes an aliphatic hydrocarbon group having from 1 to 8 carbon atoms.

Examples of the aliphatic hydrocarbon groups having from 1 to 3 carbon atoms of $R^1$, $R^2$, and $R^3$ include linear or branched alkyl groups, such as methyl, ethyl, propyl, and isopropyl groups; linear or branched alkenyl groups, such as vinyl and allyl groups; and alkynyl groups, such as an ethynyl group and a propynyl group. In an embodiment of the present invention, among these, a linear or branched alkyl group is preferred.

The $R^4$ denotes an aliphatic hydrocarbon group having from 1 to 8 carbon atoms, and examples thereof include: a linear or branched alkyl group such as a methyl group, an ethyl group, a propyl group, an isopropyl group, a butyl group, an isobutyl group, an s-butyl group, a t-butyl group, a pentyl group, a hexyl group, and an octyl group; an alkenyl group having from 2 to 8 carbon atoms, such as a vinyl group, an allyl group, and a 1-butenyl group; and an alkynyl group having from 2 to 8 carbon atoms, such as an ethynyl group and a propynyl group. In an embodiment of the present invention, from the perspective of obtaining superior affinity with a polar organic solvent, among these aliphatic hydrocarbon groups, linear or branched alkyl groups having from 1 to 8 carbon atoms are preferable, linear or branched alkyl groups having from 2 to 6 carbon atoms are particularly preferable, and linear or branched alkyl groups having from 3 to 6 carbon atoms are most preferable.

Therefore, examples of the surface-modified ND particles according to an embodiment of the present invention include ND particles having a structure including the surface modified by a group represented by the following Formula (1).

[Chemical Formula 4]

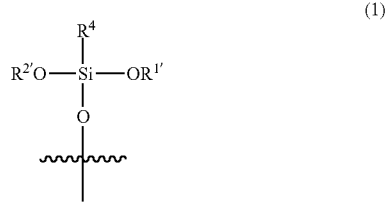

(1)

where, in Formula (1), $R^4$ denotes an aliphatic hydrocarbon group having from 1 to 8 carbon atoms, $R^{1'}$ and $R^{2'}$ may be the same or different, and are each a hydrogen atom, an aliphatic hydrocarbon group having from 1 to 3 carbon atoms, or a group represented by the following Formula (a), and the atomic bond indicated by the wavy line in the Formula bonds to the surface of the nanodiamond particles:

[Chemical Formula 5]

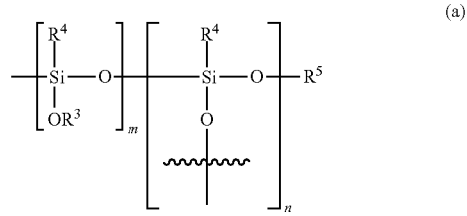

(a)

where, in Formula (a), $R^4$ is the same as described above, $R^3$ and $R^5$ may be the same or different, and each denotes a hydrogen atom or an aliphatic hydrocarbon group having from 1 to 3 carbon atoms, m and n may be the same or different and each represent an integer of 0 or greater, an atomic bond extending toward left from a silicon atom bonds to an oxygen atom, and an atomic bond indicated by a wavy line bonds to the surface of the nanodiamond particles.

$R^4$ in Formula (1) above denotes an aliphatic hydrocarbon group having from 1 to 8 carbon atoms, and corresponds to $R^4$ in Formula (1-1).

Examples of the aliphatic hydrocarbon groups having from 1 to 3 carbon atoms of $R^{1'}$, $R^{2'}$, $R^3$ and $R^5$ in the Formula (1) include linear or branched alkyl groups such as methyl, ethyl, propyl, and isopropyl groups; linear or branched alkenyl groups such as vinyl and allyl groups; and alkynyl groups such as an ethynyl group and a propynyl group. In an embodiment of the present invention, among these, a linear or branched alkyl group is preferred.

The m and n each indicate the number of units of the constituent indicated in the respective parenthesis, may be the same or different, and each denote an integer of 0 or greater. In a case where m and n are each 2 or greater, the bonding of two or more constituent units may be any of random, alternating, or block.

Furthermore, as the silane compound, in addition to a compound represented by Formula (1-1) above, a compound represented by Formula (2-1) below:

[Chemical Formula 6]

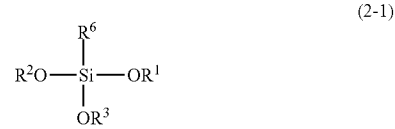

(2-1)

where, in Formula (2-1), $R^6$ denotes an aliphatic hydrocarbon group having 9 or more carbon atoms, and $R^1$, $R^2$, and $R^3$ are the same as described above, is preferably included from the perspective of further exhibiting excellent dispersibility in a polar organic solvent.

The $R^6$ is an aliphatic hydrocarbon group having 9 or more carbon atoms, and examples include linear or branched alkyl groups, such as nonyl, isononyl, decyl, isodecyl, lauryl, myristyl, isomyristyl, butyloctyl, isocetyl, hexyldecyl, stearyl, isostearyl, octyldecyl, octyldodecyl, and isobehenyl groups; linear or branched alkenyl groups, such as 8-nonenyl, 9-decenyl, 11-dodecenyl, and oleyl groups; and linear or branched alkynyl groups, such as decynyl, pentadecynyl, and octadecynyl groups. In an embodiment of the present invention, among these, from the viewpoint of obtaining greater steric hindrance and thereby excelling in an aggregation suppressing effect and being able to impart higher dispersibility, an aliphatic hydrocarbon group having 10 or more carbon atoms is preferable, and an aliphatic hydrocarbon group having 14 or more carbon atoms is particularly preferable. Note that the upper limit of the number of carbon atoms of the aliphatic hydrocarbon group is, for example, 25, and is preferably 20. Furthermore, among these, the aliphatic hydrocarbon group is preferably a linear or branched alkyl group or alkenyl group, and is particularly preferably a linear or branched alkyl group.

Therefore, the surface-modified ND particles according to an embodiment of the present invention also include ND particles having a structure including the surface modified by a group represented by Formula (2) below, along with a group represented by Formula (1) above.

[Chemical Formula 7]

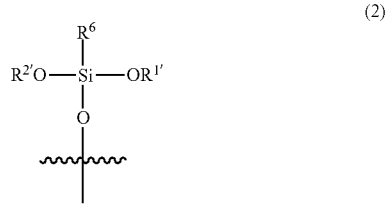

(2)

where, in Formula (2), $R^6$ denotes an aliphatic hydrocarbon group having 9 or more carbon atoms, $R^{1'}$ and $R^{2'}$ are the same as those described above, and the atomic bond indicated by a wavy line in the Formula bonds to the surface of the nanodiamond particles.

$R^6$ in Formula (2) denotes an aliphatic hydrocarbon group having 9 or more carbon atoms, and corresponds to $R^6$ in Formula (2-1).

Furthermore, the surface-modified ND particles according to an embodiment of the present invention may have, besides the group represented by Formula (1) above and the group represented by Formula (2) above, for example, one or more types of groups selected from groups represented by Formula (1') below, groups represented by Formula (2') below, and other surface functional groups (for example, an amino group, a hydroxy group, and a carboxyl group).

[Chemical Formula 8]

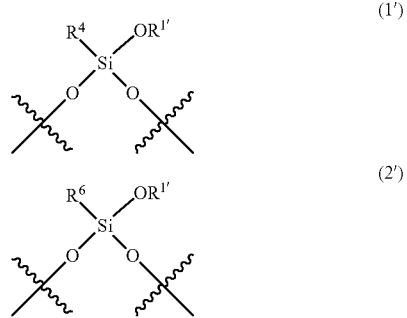

(1')

(2')

where, in the Formula, $R^{1'}$, $R^4$ and $R^6$ are the same as those described above, and an atomic bond indicated by a wavy line in the Formula bonds to the surface of the nanodiamond particles.

Of the surface-modified ND particles according to an embodiment of the present invention, surface-modified ND particles of [1] to [3] below can exhibit particularly excellent dispersibility in the polar organic solvent, and thus are preferable.

[1] ND particles having a structure in which the surface is modified by a group represented by Formula (1) above with $R^4$ in the Formula having from 1 to 3 carbon atoms (i.e., ND particles [1] with the surface modified by a short-chain aliphatic hydrocarbon group)

[2] ND particles having a structure in which the surface is modified by a group represented by Formula (1) above with $R^4$ in the Formula having from 4 to 8 carbon atoms (particularly preferably a group having from 4 to 7 carbon atoms) (i.e., ND particles [2] with the surface modified by a medium-chain aliphatic hydrocarbon group)

[3] ND particles having a structure in which the surface is modified by a group represented by Formula (1) above with $R^4$ in the Formula having from 1 to 3 carbon atoms, and by a group represented by Formula (2) above (i.e., ND particles [3] with the surface modified by a short-chain aliphatic hydrocarbon group and a long-chain aliphatic hydrocarbon group)

When the polar organic solvent is an organic solvent having an SP value from 10.0 to 14.0 for example, the ND particles [1] are preferably used as the surface-modified ND particles. In the polar organic solvent, the short-chain aliphatic hydrocarbon group (the number of carbon atoms of the $R^4$ group is, for example, from 1 to 3) of the ND particle [1] exhibits affinity toward the polar organic solvent and acts as a steric hindrance, and the groups containing an oxygen atom ($OR^{1'}$ group and $OR^{2'}$ group in Formula (1)) exhibit affinity toward the polar organic solvent, and therefore the ND particle [1] excels in affinity toward polar organic solvents, and can exhibit excellent dispersibility in polar organic solvents.

For example, when the polar organic solvent is an organic solvent having an SP value not less than 8.0 $(cal/cm^3)^{1/2}$ and less than 10.0 $(cal/cm^3)^{1/2}$, the ND particles [2] and/or the ND particles [3] are preferably used as the surface-modified ND particles.

In the polar organic solvent, the medium-chain aliphatic hydrocarbon group (the number of carbon atoms of the $R^4$ group is, for example, from 4 to 8, and preferably from 4 to 7) of the ND particle [2] exhibits affinity toward the polar organic solvent and acts as a steric hindrance, and the groups containing an oxygen atom ($OR^{1'}$ group and $OR^{2'}$ group in Formula (1)) exhibit affinity toward the polar organic solvent, and therefore the ND particle [2] excels in affinity toward polar organic solvents, and can exhibit excellent dispersibility in polar organic solvents.

Furthermore, in the polar organic solvent, the short-chain aliphatic hydrocarbon group (the number of carbon atoms of the $R^4$ group is, for example, from 1 to 3) of the ND particle [3] exhibits affinity toward the polar organic solvent, and the long-chain aliphatic hydrocarbon group ($R^6$ group) acts as a steric hindrance, and the groups containing an oxygen atom ($OR^{1'}$ group and $OR^{2'}$ group in Formulas (1) and (2)) exhibit affinity toward the polar organic solvent, and therefore the ND particle [3] excels in affinity toward polar organic solvents, and can exhibit excellent dispersibility in polar organic solvents.

The surface-modified ND particles of an embodiment according to the present invention have surface-modifying groups that are formed by silane compounds bonding to the surface of hydrophilic ND particles. Therefore, aggregation of the ND particles themselves is suppressed by the steric hindrance of the surface-modifying groups, and the aggregation of ND particles having these surface-modifying groups is better suppressed than with ND particles not having the surface-modifying groups.

Polar Organic Solvent

The polar organic solvent in the present invention is an organic solvent having an SP value [Hildebrand solubility parameter (δ), at 25° C., units: $(cal/cm^3)^{1/2}$] from 8.0 to 14.0 (preferably from 8.4 to 12.5, and particularly preferably from 9.0 to 12.0). The polar organic solvent may include one type of organic solvent alone, or may include a combination of two or more types of organic solvents. Note that when two or more types of organic solvents are included, as long as the SP value of the mixture of the two or more types of organic solvents is within the range described above, the SP value of each organic solvent included therein may be outside the range described above.

Examples of the polar organic solvent include ketones such as acetone (SP: 10.0), methyl ethyl ketone (MEK, SP: 9.3), and methyl isobutyl ketone (MIBK, SP: 8.4); ethers such as dioxane (SP: 9.8) and tetrahydrofuran (SP: 9.1); alcohols such as n-propanol (SP: 11.9), isopropanol (IPA, SP: 11.5), hexanol (SP: 10.7), and cyclohexanol (SP: 11.4); esters such as ethyl acetate (SP: 9.1); halogenated hydrocarbons such as chloroform (SP: 9.3), methylene chloride (SP: 9.7), and ethylene dichloride (SP: 9.8); carbonates such as an ethylene carbonate/diethyl carbonate (EC/DEC=1/1: volume ratio) mixed solvent (SP: 11.75) and an ethylene carbonate/diethyl carbonate/methyl ethyl carbonate (1/1/1: volume ratio) mixed solvent (SP: 10.97); and acetic acid (SP: 12.4), and acetonitrile (SP: 11.8).

Among these, in a case where the ND particle dispersion according to an embodiment of the present invention is used as an additive for a resin, from the perspective of being readily mixable or miscible with the resin, the polar organic solvent is preferably at least one type of organic solvent that is selected from ketones, ethers, alcohols, and carbonates and has an SP value from 8.0 to 14.0 $(cal/cm^3)^{1/2}$.

Method for Producing the Nanodiamond Particle Dispersion

The ND particle dispersion according to an embodiment of the present invention can be produced, for example, in a polar organic solvent, through a process (modification process) of reacting a silane compound (excluding those having a (meth)acryloyl group) with the ND particles.

For example, a dispersion of the ND particles having a structure in which the surface is modified by a group represented by Formula (1) can be produced by reacting, as a silane compound, a compound represented by Formula (1-1) with ND particles in a polar organic solvent.

In a case where a compound represented by Formula (1-1) above is used as the silane compound, the $OR^1$ group, the $OR^2$ group, and the $OR^3$ group in the Formula of the compound are easily hydrolyzed to form silanol groups, and therefore, for example, one of the silanol groups undergoes dehydration condensation with a hydroxy group present on the surface of each of the ND particles to form a covalent bond, and the other two silanol groups can undergo condensation with a silanol group of another silane compound to form a siloxane bond (Si—O—Si). As such, the compound can impart an affinity toward the polar organic solvent to the ND particles, and the ND particles can be highly dispersed in the polar organic solvent.

Additionally, a dispersion of ND particles having a structure in which the surface is modified by a group represented by Formula (1) and by a group represented by Formula (2) can be produced by reacting, as silane compounds, a compound represented by Formula (1-1) and a compound represented by Formula (2-1) with ND particles in a polar organic solvent.

In addition, in an embodiment of the present invention, a non-polar organic solvent (for example, an organic solvent having an SP value of less than 8.0 $(cal/cm^3)^{1/2}$) can be used along with the polar organic solvent, but the percentage of the polar organic solvent in the total amount of the solvent that is used in the present invention is, for example, preferably 60 mass % or greater, more preferably 80 mass % or greater, and particularly preferably 90 mass % or greater.

In a case where ND particle aggregates formed by agglutination of ND particles are present in the ND particles, the ND particle aggregates are crushed or dispersed and then the ND particles are preferably reacted with the silane compound. Alternatively, while crushing or dispersing the ND particle aggregates, the ND particles are preferably reacted with the silane compound. Through this, the surface of the ND primary particles can be modified, and the dispersibility of the nanodiamond particles in the ND particle dispersion can be improved.

Examples of the method for crushing or dispersing the ND particle aggregates include methods that process the ND particle aggregates using a high shearing mixer, a high shear mixers, a homo mixer, a ball mill, a bead mill, a high pressure homogenizer, an ultrasonic homogenizer, a colloid mill, or a jet mill, and the like. In an embodiment of the present invention, among these, ultrasonic treatment in the presence of a crushing medium (such as zirconia beads for example) is preferred.

The diameter of the grinding medium (such as zirconia beads for example) is, for example, from 15 to 500 µm, preferably from 15 to 300 µm, and particularly preferably from 15 to 100 µm.

A ratio (ND particles: silane compound, mass ratio) of the ND particles to the silane compound (if two or more are used, then the total amount thereof) supplied for the reaction is, for example, from 2:1 to 1:20. Furthermore, the concentration of the ND particles in the polar organic solvent is, for example, from 0.5 to 10 mass %, and the concentration of the silane compound in the polar organic solvent is, for example, from 5 to 40 mass %.

In a case where a compound represented by Formula (1-1) above and a compound represented by Formula (2-1) above are used as the silane compound, the ratio (mass ratio) of the (compound represented by Formula (1-1) above)/(the compound represented by Formula (2-1) above) is, for example, from 30/70 to 70/30, preferably from 40/60 to 60/40, and particularly preferably from 45/55 to 55/45.

The reaction time is, for example, from 4 to 20 hours. Furthermore, the reaction is preferably performed while heat generated is removed by using ice water or the like.

An ND particle dispersion in which the surface-modified ND particles are dispersed in the polar organic solvent can be obtained through the reaction described above.

In the modification described above, the ND particles used in the reaction with the silane compound can be produced by, for example, a detonation method.

The detonation method includes an air-cooling detonation method and a water-cooling detonation method. In an embodiment of the present invention, among these, the air-cooling detonation method is preferred from the viewpoint of obtaining ND particles having smaller primary particles compared to the case of the water-cooling detonation method.

Furthermore, the detonation can be performed in an air atmosphere or may be performed in an inert gas atmosphere, such as a nitrogen atmosphere, an argon atmosphere, or a carbon dioxide atmosphere.

An example of the method for producing the ND particles is described below; however, the ND particles used in an embodiment of the present invention are not limited to those obtained by the following production method.

Formation

First, a molded explosive attached with an electric detonator is placed inside a pressure-resistant vessel for detonation, and the vessel is sealed in a state where gas of atmospheric composition at normal pressure and the explosive to be used coexist inside the vessel. The vessel is, for example, made of iron, and the volume of the vessel is, for example, from 0.5 to 40 $m^3$. A mixture of trinitrotoluene (TNT) and cyclotrimethylenetrinitramine, i.e., hexogen (RDX), can be used as the explosive. The mass ratio (TNT/RDX) of TNT to RDX is, for example, in a range from 40/60 to 60/40.

In the formation, the electric detonator is then triggered to detonate the explosive in the vessel. "Detonation" refers to an explosion, among those associated with a chemical reaction, wherein a flame surface where the reaction occurs travels at a high speed exceeding the speed of sound. During the detonation, the explosive that is used undergoes partially incomplete combustion and releases carbon, and the carbon thereof is used as a raw material to produce ND particles through the action of the pressure and energy of the shock waves that are produced in the explosion. Due to Coulomb interaction between crystal planes as well as van der Waals forces between adjacent primary particles or crystallites, the produced ND particles aggregate very firmly to form aggregates.

In the formation, next, the vessel and its interior are left to stand for approximately 24 hours at room temperature, and are thereby allowed to be cooled. After this cooling, an ND particle crude product (including soot and aggregates of ND particles) is collected by using a spatula to scrape off the ND particle crude product deposited on the inner wall of the vessel. Crude product of ND particles can be obtained by the method described above.

Acid Treatment Acid treatment is a process that allows a strong acid to act on the ND particle crude product obtained, for example, in an aqueous solvent to remove the metal oxide. The ND particle crude product obtained by the detonation method is prone to inclusion of a metal oxide, and the metal oxide is an oxide of Fe, Co, Ni, or the like resulting from the vessel or the like used in the detonation method. The metal oxide can be dissolved and removed from the ND particle crude product by allowing a predetermined strong acid to act thereon in an aqueous solvent, for example. The strong acid used in the acid treatment is preferably a mineral acid, and examples thereof include hydrochloric acid, hydrofluoric acid, sulfuric acid, nitric acid, and mixtures thereof. The concentration of the strong acid used in the acid treatment is, for example, from 1 to 50 mass %. The acid treatment temperature is, for example, from 70 to 150° C. The duration of the acid treatment is, for example, from 0.1 to 24 hours. In addition, the acid treatment can be performed under reduced pressure, under normal pressure, or under increased pressure. After such acid treatment, the solid content (including ND aggregates) is preferably washed with water through decantation for example, until the pH of the precipitate liquid becomes 2 to 3. If the content of the metal oxide in the ND particle crude product is small, the acid treatment such as that described above may be omitted.

Oxidation Treatment

The oxidation treatment is a process to remove graphite from the ND particle crude product using an oxidizing agent. The ND particle crude product obtained by the detonation method includes graphite, and this graphite is derived from carbon that did not form ND particle crystals, the carbon thereof being from among the carbon released by partially incomplete combustion of the explosive that is used. The graphite can be removed from the ND particle crude product by allowing a predetermined oxidizing agent to act thereon in an aqueous solvent. Furthermore, by allowing the oxidizing agent to act thereon, an oxygen-containing group, such as a carboxyl group or a hydroxy group, can be introduced onto the ND particle surface.

Examples of the oxidizing agent used in the oxidation treatment include chromic acid, chromic anhydride, dichromic acid, permanganic acid, perchloric acid, nitric acid, mixtures of these, mixed acids of at least one type selected from these and another acid (e.g., sulfuric acid), and salts of these. In an embodiment of the present invention, among these oxidizing agents, use of a mixed acid (especially, a mixed acid of sulfuric acid and nitric acid) is preferred from the viewpoint of environmental friendliness and excellent action of oxidizing and removing the graphite.

The mixture ratio of sulfuric acid to nitric acid (sulfuric acid/nitric acid, mass ratio) in the mixed acid is preferably, for example, from 60/40 to 95/5, since when the mixture ratio is in that range, even under around the normal pressure (e.g., 0.5 to 2 atm), it is possible to efficiently oxidize and remove graphite at, for example, a temperature of 130° C. or higher (particularly preferably 150° C. or higher, and the upper limit is, for example, 200° C.). The lower limit is preferably 65/35, and particularly preferably 70/30. Furthermore, the upper limit is preferably 90/10, particularly preferably 85/15, and most preferably 80/20.

When the proportion of the nitric acid in the mixed acid is greater than the range described above, the content of the sulfuric acid having a high boiling point becomes smaller. Therefore, at a pressure near atmospheric pressure, the reaction temperature becomes, for example, 120° C. or lower, and the efficiency of graphite removal tends to decrease. On the other hand, when the proportion of the nitric acid in the mixed acid is less than the range described above, the efficiency of graphite removal tends to decrease because it is the nitric acid that contributes significantly to the oxidation of the graphite.

The usage amount of the oxidizing agent (especially, the mixed acid) is, for example, from 10 to 50 parts by mass, preferably from 15 to 40 parts by mass, and particularly preferably from 20 to 40 parts by mass, relative to 1 part by mass of the ND particle crude product. Furthermore, the usage amount of the sulfuric acid in the mixed acid is, for example, from 5 to 48 parts by mass, preferably from 10 to 35 parts by mass, and particularly preferably from 15 to 30 parts by mass, relative to 1 part by mass of the ND particle crude product, and the usage amount of the nitric acid in the mixed acid is, for example, from 2 to 20 parts by mass, preferably from 4 to 10 parts by mass, and particularly preferably from 5 to 8 parts by mass, relative to 1 part by mass of the ND particle crude product.

Furthermore, when the mixed acid is used as the oxidizing agent, a catalyst may be used together with the mixed acid. The use of a catalyst can further enhance the efficiency of graphite removal. Examples of the catalyst include copper (II) carbonate. The usage amount of the catalyst is, for example, approximately from 0.01 to 10 parts by mass per 100 parts by mass of the ND particle crude product.

The oxidation treatment temperature is, for example, from 100 to 200° C. The duration of the oxidation treatment is, for example, from 1 to 24 hours. The oxidation treatment can be performed under reduced pressure, under atmospheric pressure, or under increased pressure.

After such oxidation treatment, it is preferable to remove the supernatant by decantation, for example. In addition, in decantation, the solid content is preferably washed with water. The supernatant liquid from the initial washing with water is colored, and thus, the solid content is preferably repeatedly washed with water until the supernatant liquid becomes visually transparent.

Furthermore, the ND particles after oxidation treatment may be subjected to an oxidation treatment or reduction treatment in a gas phase as necessary. By performing an oxidation treatment in the gas phase, ND particles having a large amount of C=O groups on the surface are obtained. In addition, by carrying out a reduction treatment in the gas phase, ND particles having a large amount of C—H groups on the surface are produced.

Further, the ND particles after the oxidation treatment may be subjected to a crushing treatment as necessary. The crushing treatment can be performed using, for example, a high shearing mixer, a high shear mixer, a homomixer, a ball mill, a bead mill, a high pressure homogenizer, an ultrasonic homogenizer, or a colloid mill. Note that the crushing treatment may be performed by a wet process (for example, a crushing treatment in a state of being suspended in water or the like) or may be performed by a dry process. When the crushing treatment is performed by a dry process, it is preferable to provide a drying step before the crushing treatment.

Drying

In the present method, drying is preferably performed next. For example, a spray dryer, an evaporator, or the like is used to evaporate off a liquid content from the ND particle-containing solution obtained by the process described above, after which the resulting residual solid content is dried by heating in a drying oven. The temperature for heat drying is, for example, from 40 to 150° C. Through such drying, ND particles are obtained.

EXAMPLES

Hereinafter, the present invention will be described more specifically with reference to examples, but the present invention is not limited by these examples.

Example 1

The ND particle dispersion and the surface-modified ND particles were produced by the following processes.

Formation

First, the formation of nanodiamonds by a detonation method was performed. In the present process, first, a molded explosive attached with an electric detonator was placed inside a pressure-resistant vessel for detonation, and the vessel was sealed. The vessel was made of iron and had a capacity of 15 m$^3$. As the explosive, 0.50 kg of a mixture of TNT and RDX was used. The mass ratio of the TNT and RDX (TNT/RDX) in the explosive was 50/50. The electric detonator was then triggered to detonate the explosive in the vessel (formation of nanodiamond by detonation method). Subsequently, the vessel was left stand at room temperature for 24 hours, and thereby the temperature of the vessel and the contents was reduced. After this cooling, a nanodiamond crude product (containing soot and aggregates of nanodiamond particles formed by the above detonation method) adhered to the inner wall of the vessel was scraped off with a spatula, and the nanodiamond crude product was thereby collected.

Acid-Treating

The nanodiamond particle crude product obtained by performing the formation as described above multiple times was then subjected to an acid treatment. Specifically, 6 L of a 10 mass % hydrochloric acid was added to 200 g of the nanodiamond crude product to form a slurry, and the slurry was subjected to a heat treatment under reflux at normal pressure conditions for 1 hour. The heating temperature in this acid treatment was from 85 to 100° C. Next, after cooling, the solid (containing the nanodiamond aggregates and soot) was washed with water by decantation. The solid was repeatedly washed with water by decantation until the pH of the precipitation solution reached 2 from the low pH side.

Oxidation Treatment

An oxidation treatment was then performed. Specifically, 6 L of 98 mass % sulfuric acid and 1 L of 69 mass % nitric acid were added to the precipitate solution (containing the nanodiamond aggregate) obtained through decantation after the acid treatment to form a slurry, and then the slurry was subjected to heat treatment under reflux at normal pressure conditions for 48 hours. The heating temperature in this oxidation treatment was from 140 to 160° C. Next, after cooling, the solid (containing the nanodiamond aggregates) was washed with water by decantation. The initial supernatant liquid from the water washing was colored, and therefore washing of the solid content with water by decantation was repeated until the supernatant liquid became visually clear.

Drying

Next, the precipitate liquid (including nanodiamond aggregates) obtained through decantation after the oxidation treatment was subjected to a drying treatment, and the ND particles were obtained as a dried powder. As a technique for the drying treatment, evaporation to dryness performed by using an evaporator was adopted.

Modification

An amount of 0.3 g of the ND particles obtained in the drying process described above was weighed into a reaction vessel, 16 mL of MIBK (SP: 8.4) as a polar organic solvent, and 1.2 g of methyltrimethoxysilane as a silane compound were added thereto, and the mixture was stirred for 10 minutes.

After stirring, 36 g of zirconia beads (trade name "YTZ", available from Tosoh Corporation; diameter: 30 μm) was added. After the addition, while cooling in ice water, the mixture was subjected to an ultrasonic treatment for 8 hours using an ultrasonic dispersing machine (model "UH-600S", available from SMT Co., Ltd.) with a tip of an oscillator of the ultrasonic dispersing machine immersed in the solution in the reaction vessel, and the ND particles and the silane compound were reacted. The solution was initially gray, but the ND particles were gradually reduced in particle size, thereby improving dispersibility, and ultimately, a homogeneous, black liquid was formed. This is thought to be because the ND particles were sequentially disintegrated (crushed) from ND particle aggregates, the silane compound acted on the dissociated ND particles and bonded thereto, and the surface-modified ND particles were dispersed and stabilized in the MIBK. An ND particle dispersion was thus obtained.

The particle size distribution of the surface-modified ND particles in the obtained ND particle dispersion was measured by dynamic light scattering (non-contact backscattering) using a device (trade name "Zetasizer Nano ZS") available from Malvern Panalytical Ltd., and the particle diameter (D50) of the surface-modified ND particles was determined.

Example 2

An ND particle dispersion was obtained in the same manner as in Example 1 with the exception that 0.6 g of methyltrimethoxysilane and 0.6 g of hexadecyltrimethoxysilane were used as the silane compound in the modifying process.

Example 3

An ND particle dispersion was obtained in the same manner as in Example 1 with the exception that 1.2 g of propyltrimethoxysilane was used as the silane compound in the modifying process.

Example 4

An ND particle dispersion was obtained in the same manner as in Example 1 with the exception that 0.6 g of propyltrimethoxysilane and 0.6 g of hexadecyltrimethoxysilane were used as the silane compound in the modifying process.

Example 5

An ND particle dispersion was obtained in the same manner as in Example 1 with the exception that in the modifying process, 1.2 g of isobutyltrimethoxysilane was used as the silane compound and the ultrasonic treatment time was changed to 20 hours.

Example 6

An ND particle dispersion was obtained in the same manner as in Example 1 with the exception that in the modifying process, 1.2 g of hexyltrimethoxysilane was used as the silane compound and the ultrasonic treatment time was changed to 20 hours.

Example 7

An ND particle dispersion was obtained in the same manner as in Example 1 with the exception that in the modifying process, 1.2 g of octyltrimethoxysilane was used as the silane compound and the ultrasonic treatment time was changed to 20 hours.

Comparative Example 1

An ND particle dispersion was obtained in the same manner as in Example with the exception that 1.2 g of hexadecyltrimethoxysilane was used as the silane compound in the modifying process.

The results are summarized and shown in the table below.

Example 8

An ND particle dispersion was obtained in the same manner as in Example 1 with the exception that MEK (SP: 9.3) was used as the polar organic solvent in the modifying process.

Example 9

An ND particle dispersion was obtained in the same manner as in Example 2 with the exception that MEK (SP: 9.3) was used as the polar organic solvent in the modifying process.

Example 10

An ND particle dispersion was obtained in the same manner as in Example 6 with the exception that MEK (SP: 9.3) was used as the polar organic solvent in the modifying process.

Comparative Example 2

An ND particle dispersion was obtained in the same manner as in Comparative Example 1 with the exception that MEK (SP: 9.3) was used as the polar organic solvent in the modifying process.

The results are summarized and shown in the table below.

TABLE 2

|  | Example 8 | Example 9 | Example 10 | Comparative Example 2 |
|---|---|---|---|---|
| Short-chain aliphatic hydrocarbon group | Methyl | Methyl | — | — |
| Medium-chain aliphatic hydrocarbon group | — | — | Hexyl | — |
| Long-chain aliphatic hydrocarbon group | — | Hexadecyl | — | Hexadecyl |
| Polar organic solvent | MEK | MEK | MEK | MEK |
| Particle diameter (D50) | 32 nm | 10 nm | 22 nm | 980 nm |

Example 11

An ND particle dispersion was obtained in the same manner as in Example 3 with the exception that THF (SP: 9.1) was used as the polar organic solvent in the modifying process.

TABLE 1

|  | Example 1 | Example 2 | Example 3 | Example 4 | Example 5 | Example 6 | Example 7 | Comparative Example 1 |
|---|---|---|---|---|---|---|---|---|
| Short-chain aliphatic hydrocarbon group | Methyl | Methyl | Propyl | Propyl | — | — | — | — |
| Medium-chain aliphatic hydrocarbon group | — | — | — | — | Isobutyl | Hexyl | Octyl | — |
| Long-chain aliphatic hydrocarbon group | — | Hexadecyl | — | Hexadecyl | — | — | — | Hexadecyl |
| Polar organic solvent | MIBK | MIBK | MIBK | MIBK | MIBK | MIBK | MIBK | MIBK |
| Particle diameter (D50) | 42 nm | 20 nm | 18 nm | 11 nm | 18 nm | 12 nm | 20 nm | 590 nm |

Example 12

An ND particle dispersion was obtained in the same manner as in Example 4 with the exception that THF (SP: 9.1) was used as the polar organic solvent in the modifying process.

Example 13

An ND particle dispersion was obtained in the same manner as in Example 6 with the exception that THF (SP: 9.1) was used as the polar organic solvent in the modifying process.

Comparative Example 3

An ND particle dispersion was obtained in the same manner as in Comparative Example 1 with the exception that THF (SP: 9.1) was used as the polar organic solvent in the modifying process.

The results are summarized and shown in the table below.

TABLE 3

|  | Example 11 | Example 12 | Example 13 | Comparative Example 3 |
|---|---|---|---|---|
| Short-chain aliphatic hydrocarbon group | Propyl | Propyl | — | — |
| Medium-chain aliphatic hydrocarbon group | — | — | Hexyl | — |
| Long-chain aliphatic hydrocarbon group | — | Hexadecyl | — | Hexadecyl |
| Polar organic solvent | THF | THF | THF | THF |
| Particle diameter (D50) | 20 nm | 18 nm | 17 nm | 790 nm |

Example 14

The ND particle dispersion obtained in Example 3 was left standing for an entire day and night, after which a supernatant liquid was collected, and 2 g of the supernatant liquid was added dropwise to 4 g of hexane. The mixed solvent after the dropwise addition was then subjected to a centrifugal separation treatment (centrifugal force: 20000× g, centrifugation time: 10 minutes), and the precipitated solid content (including surface-modified ND particles) was collected. Two grams of IPA (SP: 11.5) were added to the solid content collected in this manner, the mixture was subjected to an ultrasonic treatment for 10 minutes using an ultrasonic treatment device (trade name "ASU-10", available from As One Corporation), and an ND particle dispersion was obtained.

Example 15

An ND particle dispersion was obtained in the same manner as in Example 14 with the exception that the ND particle dispersion obtained in Example 4 was used instead of the ND particle dispersion obtained in Example 3.

Comparative Example 4

An ND particle dispersion was obtained in the same manner as in Example 14 with the exception of using the ND particle dispersion obtained in Comparative Example 1 instead of the ND particle dispersion obtained in Example 3. However, the ND particles completely settled, and the particle size distribution could not be measured.

The results are summarized and shown in the table below.

TABLE 4

|  | Example 14 | Example 15 | Comparative Example 4 |
|---|---|---|---|
| Short-chain aliphatic hydrocarbon group | Propyl | Propyl | — |
| Medium-chain aliphatic hydrocarbon group | — | — | — |
| Long-chain aliphatic hydrocarbon group | — | Hexadecyl | Hexadecyl |
| Polar organic solvent | IPA | IPA | IPA |
| Particle diameter (D50) | 11 nm | 17 nm | — |

Example 16

Two grams of the ND particle dispersion obtained in Example 14 were placed in a flask of a rotary evaporator (R-124, available from BUCHI Corporation), and then 2 g of an EC/DEC (1/1) mixed solvent (SP: 11.75) were added.

Next, when the rotary evaporator was operated and the flask was rotated at a speed of 50 rpm under a reduced pressure of 0.035 MPa at a temperature of 50° C., and the IPA used above was evaporated. The IPA was cooled and discharged outside of the system. This operation was continued for 1 hour to replace IPA in the ND particle dispersion with the EC/DEC mixed solvent.

Comparative Example 5

An ND particle dispersion was obtained in the same manner as in Example 16 with the exception of using the ND particle dispersion obtained in Comparative Example 4 instead of the ND particle dispersion obtained in Example 14, but the ND particles completely settled, and the particle size distribution could not be measured.

The results are summarized and shown in the table below.

TABLE 5

|  | Example 16 | Comparative Example 5 |
|---|---|---|
| Short-chain aliphatic hydrocarbon group | Propyl | — |
| Medium-chain aliphatic hydrocarbon group | — | — |

TABLE 5-continued

|  | Example 16 | Comparative Example 5 |
|---|---|---|
| Long-chain aliphatic hydrocarbon group | — | Hexadecyl |
| Polar organic solvent | EC/DEC | EC/DEC |
| Particle diameter (D50) | 17 nm | — |

To summarize the above, configurations according to an embodiment of the present invention and variations thereof will be described below.

[1] A nanodiamond particle dispersion including nanodiamond particles dispersed in an organic solvent, in which the nanodiamond particles have a silane compound (excluding those having a (meth)acryloyl group) bonded to a surface of the nanodiamond particles, the organic solvent has an SP value from 8.0 to 14.0 $(cal/cm^3)^{1/2}$, and the nanodiamond particles are dispersed with a particle diameter (D50) from 2 to 100 nm.

[2] The nanodiamond particle dispersion according to [1], in which the nanodiamond particles having a silane compound bonded to the surface are nanodiamond particles having a structure including the surface modified by a group represented by Formula (1).

[3] The nanodiamond particle dispersion according to [1], in which the nanodiamond particles having a silane compound bonded to the surface are nanodiamond particles having a structure including the surface modified by a group represented by Formula (1) where $R^4$ is an alkyl group having from 1 to 3 carbon atoms.

[4] The nanodiamond particle dispersion according to [1], in which the nanodiamond particles having a silane compound bonded to the surface are nanodiamond particles having a structure including the surface modified by a group represented by Formula (1) where $R^4$ is an alkyl group having from 4 to 8 carbon atoms (preferably an alkyl group having from 4 to 7 carbon atoms).

[5] The nanodiamond particle dispersion according to [1], in which the nanodiamond particles having a silane compound bonded to the surface are nanodiamond particles having a structure including the surface modified by a group represented by Formula (1) where $R^4$ is an alkyl group having from 1 to 3 carbon atoms, and by a group represented by Formula (2).

[6] The nanodiamond particle dispersion according to [1], in which the nanodiamond particles having a silane compound bonded to the surface are nanodiamond particles having a structure including the surface modified by a group represented by Formula (1) (wherein, $R^4$ is an alkyl group having from 1 to 3 carbon atoms), and by a group represented by Formula (2) where $R^6$ is an alkyl group having from 10 to 25 carbon atoms (and particularly preferably an alkyl group having from 14 to 20 carbon atoms).

[7] The nanodiamond particle dispersion according to any one of [1] to [6], in which a content of the organic solvent having an SP value of less than 8.0 $(cal/cm^3)^{1/2}$ is 40 mass % or less (preferably 20 mass % or less, and particularly preferably 10 mass % or less) of the total amount of solvent contained in the nanodiamond particle dispersion.

[8] The nanodiamond particle dispersion according to any one of [1] to [7], in which the organic solvent having an SP value from 8.0 to 14.0 $(cal/cm^3)^{1/2}$ is at least one type of organic solvent selected from ketones, ethers, alcohols, and carbonates.

[9] A nanodiamond particle dispersion including nanodiamond particles dispersed in an organic solvent, in which the nanodiamond particles have a structure including the surface modified by a group represented by Formula (1), where $R^4$ in the Formula has 1 to 3 carbon atoms, the organic solvent has an SP value from 10.0 to 14.0 $(cal/cm^3)^{1/2}$, and the nanodiamond particles are dispersed with the particle diameter (D50) from 2 to 100 nm.

[10] A nanodiamond particle dispersion including first nanodiamond particles and/or second nanodiamond particles dispersed in an organic solvent, in which the first nanodiamond particles have a structure including the surface modified by a group represented by Formula (1) where $R^4$ in the Formula has 4 to 8 carbon atoms (particularly preferably, a group having from 4 to 7 carbon atoms), and the second nanodiamond particles have a structure including the surface modified by a group represented by Formula (1) where $R^4$ in the Formula has 1 to 3 carbon atoms, and by a group represented by Formula (2), the organic solvent has an SP value not less than 8.0 $(cal/cm^3)^{1/2}$ and less than 10.0 $(cal/cm^3)^{1/2}$, and the first nanodiamond particles and/or the second nanodiamond particles are dispersed with the particle diameter (D50) of 2 to 100 nm.

[11] A nanodiamond particle dispersion including first nanodiamond particles and/or second nanodiamond particles dispersed in an organic solvent, in which the first nanodiamond particles have a structure including the surface modified by a group represented by Formula (1) where $R^4$ in the Formula has 4 to 8 carbon atoms (particularly preferably, a group having from 4 to 7 carbon atoms), and the second nanodiamond particles have a structure including the surface modified by a group represented by Formula (1) where $R^4$ in the Formula has from 1 to 3 carbon atoms, and by a group represented by Formula (2) ($R^6$ in the Formula being an alkyl group having from 10 to 25 carbon atoms (and particularly preferably, an alkyl group having from 14 to 20 carbon atoms)), the organic solvent has an SP value not less than 8.0 $(cal/cm^3)^{1/2}$ and less than 10.0 $(cal/cm^3)^{1/2}$, and the first nanodiamond particles and/or the second nanodiamond particles are dispersed with the particle diameter (D50) from 2 to 100 nm.

[12] The nanodiamond particle dispersion according to any one of [1] to [11], in which the content of the nanodiamond particles having a silane compound bonded to the surface is from 0.0001 to 10 mass %.

[13] The nanodiamond particle dispersion according to any one of [1] to [12], in which the content of the nanodiamond particles having a silane compound bonded to the surface is from 0.0001 to 10 parts by mass (preferably from 0.01 to 8 parts by mass, and particularly preferably from 1 to 5 parts by mass) per 100 parts by mass of the polar organic solvent.

INDUSTRIAL APPLICABILITY

The ND particle dispersion of the present invention suppresses aggregation of ND particles and exhibits high dispersibility. Therefore, the ND particle dispersion of the present invention can be suitably used as an additive that imparts to resin, etc. the properties of fine ND particles, or as a friction-reducing agent or lubricant applied to a sliding part of a mechanical component, or the like.

REFERENCE SIGNS LIST

1 Surface-modified nanodiamond particle
2 Nanodiamond particle (partial)
3 Surface-modifying group
4, 4' Aliphatic hydrocarbon group

The invention claimed is:

1. A nanodiamond particle dispersion comprising nanodiamond particles dispersed in an organic solvent, wherein the nanodiamond particles have a structure including the surface modified by a group represented by Formula (1):

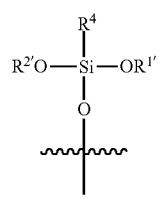
(1)

where, in Formula (1), $R^4$ denotes an aliphatic hydrocarbon group having from 1 to 8 carbon atoms, $R^{1'}$ denotes a group represented by Formula (a), $R^{2'}$ denotes a hydrogen atom, an aliphatic hydrocarbon group having from 1 to 3 carbon atoms, or a group represented by Formula (a), and the atomic bond indicated by the wavy line in the Formula bonds to the surface of the nanodiamond particles:

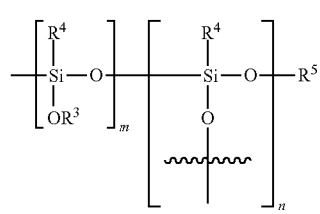
(a)

where, in Formula (a), $R^4$ is the same as above, $R^3$ and $R^5$ may be the same or different, and each denotes a hydrogen atom or an aliphatic hydrocarbon group having from 1 to 3 carbon atoms, m represents an integer of 0 or greater, n represents an integer greater than 0, an atomic bond extending leftward from a silicon atom bonds to an oxygen atom, and an atomic bond indicated by a wavy line bonds to the surface of the nanodiamond particles, the organic solvent has an SP value from 8.0 to 14.0 $(cal/cm^3)^{1/2}$, and the nanodiamond particles are dispersed with a particle diameter (D50) from 2 to 100 nm.

2. The nanodiamond particle dispersion according to claim 1, wherein the organic solvent having an SP value from 8.0 to 14.0 $(cal/cm^3)^{1/2}$ is at least one organic solvent selected from ketones, ethers, alcohols, and carbonates.

3. The nanodiamond particle dispersion according to claim 1, wherein the nanodiamond particles having a silane compound bonded to the surface are nanodiamond particles having a structure including the surface modified by a group represented by Formula (1'):

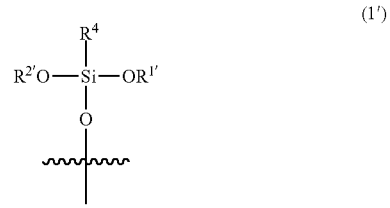
(1')

where, in Formula (1'), $R^4$ denotes an alkyl group having from 1 to 3 carbon atoms, $R^{1'}$ denotes a group represented by Formula (a), $R^{2'}$ denotes a hydrogen atom, an aliphatic hydrocarbon group having from 1 to 3 carbon atoms, or a group represented by Formula (a), and the atomic bond indicated by the wavy line in the Formula bonds to the surface of the nanodiamond particles:

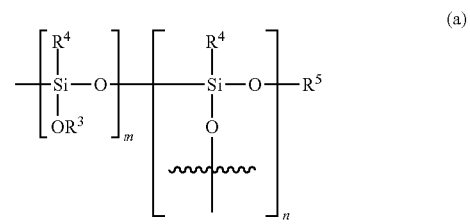
(a)

where, in Formula (a), $R^4$ is the same as described above, $R^3$ and $R^5$ may be the same or different and each denotes a hydrogen atom or an aliphatic hydrocarbon group having from 1 to 3 carbon atoms, m represents an integer of 0 or greater, n represents an integer greater than 0, an atomic bond extending to the left from a silicon atom bonds to an oxygen atom, and an atomic bond indicated by a wavy line bonds to the surface of the nanodiamond particles.

4. The nanodiamond particle dispersion according to claim 1, wherein the nanodiamond particles having a silane compound bonded to the surface are nanodiamond particles having a structure including the surface modified by a group represented by Formula (1"):

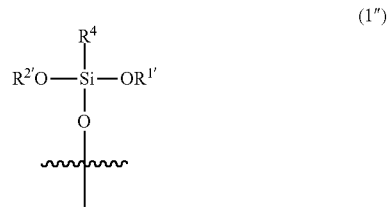
(1")

where, in Formula (1"), $R^4$ denotes an alkyl group having from 4 to 8 carbon atoms, $R^{1'}$ denotes a group represented by Formula (a), $R^{2'}$ denotes a hydrogen atom, an aliphatic hydrocarbon group having from 1 to 3 carbon atoms, or a group represented by Formula (a), and the atomic bond indicated by the wavy line in the Formula bonds to the surface of the nanodiamond particles:

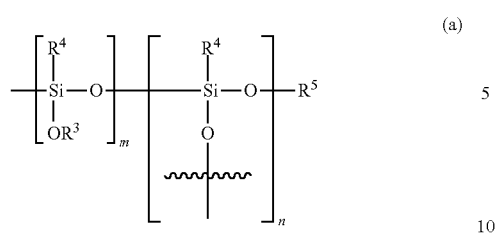

where, in Formula (a), $R^4$ is the same as described above, $R^3$ and $R^5$ may be the same or different and each denotes a hydrogen atom or an aliphatic hydrocarbon group having from 1 to 3 carbon atoms, m represents an integer of 0 or greater, n represents an integer greater than 0, an atomic bond extending to the left from a silicon atom bonds to an oxygen atom, and an atomic bond indicated by a wavy line bonds to the surface of the nanodiamond particles.

5. The nanodiamond particle dispersion according to claim 1, wherein the nanodiamond particles having a silane compound bonded to the surface are nanodiamond particles having a structure including the surface modified by a group represented by Formula (1'):

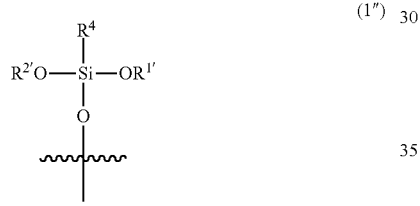

where, in Formula (1'), $R^4$ denotes an alkyl group having from 1 to 3 carbon atoms, $R^{1'}$ denotes a group represented by Formula (a), $R^{2'}$ denotes a hydrogen atom, an aliphatic hydrocarbon group having from 1 to 3 carbon atoms, or a group represented by Formula (a), and the atomic bond indicated by the wavy line in the Formula bonds to the surface of the nanodiamond particles:

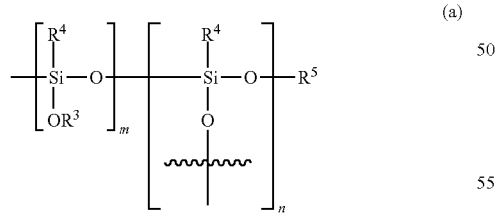

where, in Formula (a), $R^4$ is the same as described above, $R^3$ and $R^5$ may be the same or different and each denotes a hydrogen atom or an aliphatic hydrocarbon group having from 1 to 3 carbon atoms, m represents an integer of 0 or greater, n represents an integer greater than 0, an atomic bond extending to the left from a silicon atom bonds to an oxygen atom, and an atomic bond indicated by a wavy line bonds to the surface of the nanodiamond particles;

and by a group represented by Formula (2):

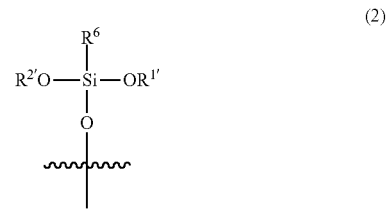

where, in Formula (2), $R^6$ denotes an aliphatic hydrocarbon group having 9 or more carbon atoms; $R^{1'}$ and $R^{2'}$ are the same as those described above; and the atomic bond indicated by the wavy line in the Formula bonds to the surface of the nanodiamond particles.

6. The nanodiamond particle dispersion according to claim 1, wherein the nanodiamond particles having a silane compound bonded to the surface are nanodiamond particles having a structure including the surface modified by a group represented by Formula (1'):

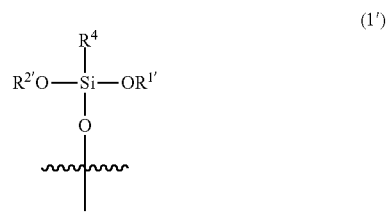

where, in Formula (1'), $R^4$ denotes an alkyl group having from 1 to 3 carbon atoms, $R^{1'}$ denotes a group represented by Formula (a), $R^{2'}$ denotes a hydrogen atom, an aliphatic hydrocarbon group having from 1 to 3 carbon atoms, or a group represented by Formula (a), and the atomic bond indicated by the wavy line in the Formula bonds to the surface of the nanodiamond particles:

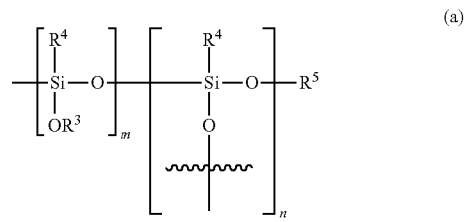

where, in Formula (a), $R^4$ is the same as described above, $R^3$ and $R^5$ may be the same or different and each denotes a hydrogen atom or an aliphatic hydrocarbon group having from 1 to 3 carbon atoms, m represents an integer of 0 or greater, n represents an integer greater than 0, an atomic bond extending to the left from a silicon atom bonds to an oxygen atom, and an atomic bond indicated by a wavy line bonds to the surface of the nanodiamond particles;

and by a group represented by Formula (2'):

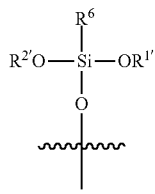

(2')

where, in Formula (2'), $R^6$ denotes an aliphatic hydrocarbon group having 14 to 20 carbon atoms; $R^{1'}$ and $R^{2'}$ are the same as those described above; and the atomic bond indicated by the wavy line in the Formula bonds to the surface of the nanodiamond particles.

7. The nanodiamond particle dispersion according to claim 1, wherein a content of the organic solvent having an SP value of less than 8.0 $(cal/cm^3)^{1/2}$ is 10 mass % or less of a total amount of solvent contained in the nanodiamond particle dispersion.

8. The nanodiamond particle dispersion according to claim 1, wherein the content of the nanodiamond particles having a silane compound bonded to the surface is from 0.0001 to 10 mass %.

9. The nanodiamond particle dispersion according to claim 1, wherein the content of the nanodiamond particles having a silane compound bonded to the surface is from 0.0001 to 10 parts by mass per 100 parts by mass of the organic solvent having an SP value from 8.0 to 14.0 $(cal/cm^3)^{1/2}$.

10. A nanodiamond particle dispersion comprising nanoparticles dispersed in an organic solvent, wherein the organic solvent has an SP value from 10.0 to 14.0 $(cal/cm^3)^{1/2}$, the nanodiamond particles are dispersed with a particle diameter (D50) from 2 to 100 nm, and the nanodiamond particles have a structure including the surface modified by a group represented by Formula (1'):

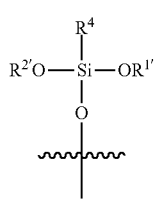

(1')

where, in Formula (1'), $R^4$ denotes an alkyl group having from 1 to 3 carbon atoms, $R^{1'}$ denotes a group represented by Formula (a), $R^{2'}$ denotes a hydrogen atom, an aliphatic hydrocarbon group having from 1 to 3 carbon atoms, or a group represented by Formula (a), and the atomic bond indicated by the wavy line in the Formula bonds to the surface of the nanodiamond particles:

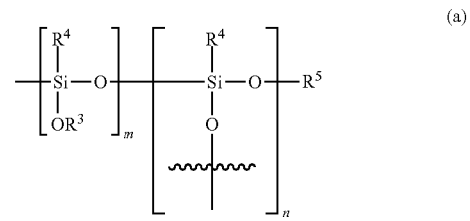

(a)

where, in Formula (a), $R^4$ is the same as described above, $R^3$ and $R^5$ may be the same or different and each denotes a hydrogen atom or an aliphatic hydrocarbon group having from 1 to 3 carbon atoms, m represents an integer of 0 or greater, n represents an integer greater than 0, an atomic bond extending to the left from a silicon atom bonds to an oxygen atom, and an atomic bond indicated by a wavy line bonds to the surface of the nanodiamond particles.

11. A nanodiamond particle dispersion comprising first nanodiamond particles and second nanodiamond particles dispersed in an organic solvent, wherein the organic solvent has an SP value not less than 8.0 $(cal/cm^3)^{1/2}$ and less than 10.0 $(cal/cm^3)^{1/2}$, the first nanodiamond particles and the second nanodiamond particles are dispersed with a particle diameter (D50) from 2 to 100 nm, the first nanodiamond particles have a structure including the surface modified by a group represented by Formula (1'):

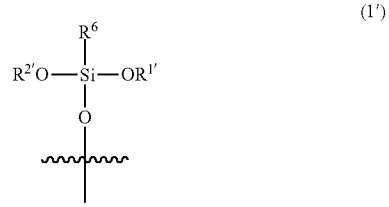

(1')

where, in Formula (1'), $R^4$ denotes an alkyl group having from 1 to 3 carbon atoms, $R^{1'}$ denotes a group represented by Formula (a), $R^{2'}$ denotes a hydrogen atom, an aliphatic hydrocarbon group having from 1 to 3 carbon atoms, or a group represented by Formula (a), and the atomic bond indicated by the wavy line in the Formula bonds to the surface of the nanodiamond particles:

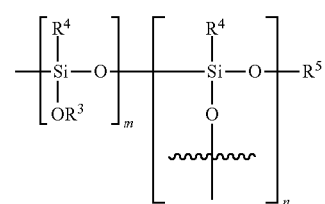

(a)

where, in Formula (a), $R^4$ is the same as described above, $R^3$ and $R^5$ may be the same or different and each denotes a hydrogen atom or an aliphatic hydrocarbon group having from 1 to 3 carbon atoms, m represents an integer of 0 or greater, n represents an integer greater than 0, an atomic bond extending to the left from a silicon atom bonds to an oxygen atom, and an atomic bond indicated by a wavy line bonds to the surface of the nanodiamond particles.

and the second nanodiamond particles have a structure including the surface modified by a group represented by Formula (2):

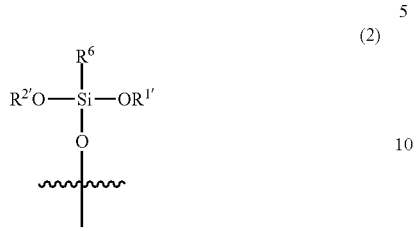

(2)

where, in Formula (2), $R^6$ denotes an aliphatic hydrocarbon group having 9 or more carbon atoms; $R^{1'}$ and $R^{2'}$ are the same as those described above; and the atomic bond indicated by the wavy line in the Formula bonds to the surface of the second nanodiamond particles.

12. A nanodiamond particle dispersion comprising first nanodiamond particles and second nanodiamond particles dispersed in an organic solvent, wherein the organic solvent has an SP value not less than 8.0 $(cal/cm^3)^{1/2}$ and less than 10.0 $(cal/cm^3)^{1/2}$, the first nanodiamond particles and the second nanodiamond particles are dispersed with a particle diameter (D50) from 2 to 100 nm, the first nanodiamond particles have a structure including the surface modified by a group represented by Formula (1'):

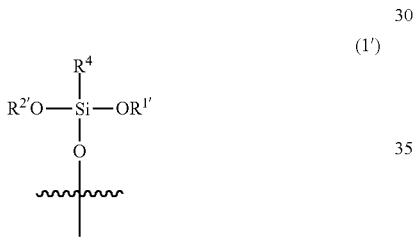

(1')

where, in Formula (1'), $R^4$ denotes an alkyl group having from 1 to 3 carbon atoms, $R^{1'}$ denotes a group represented by Formula (a), $R^{2'}$ denotes a hydrogen atom, an aliphatic hydrocarbon group having from 1 to 3 carbon atoms, or a group represented by Formula (a), and the atomic bond indicated by the wavy line in the Formula bonds to the surface of the nanodiamond particles:

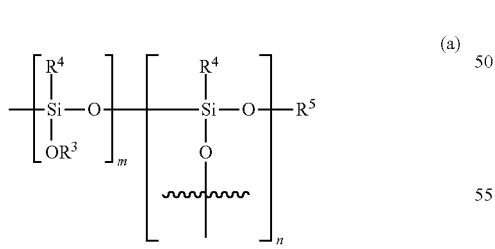

(a)

where, in Formula (a), $R^4$ is the same as described above, $R^3$ and $R^5$ may be the same or different and each denotes a hydrogen atom or an aliphatic hydrocarbon group having from 1 to 3 carbon atoms, m represents an integer of 0 or greater, n represents an integer greater than 0, an atomic bond extending to the left from a silicon atom bonds to an oxygen atom, and an atomic bond indicated by a wavy line bonds to the surface of the nanodiamond particles.

and the second nanodiamond particles have a structure including the surface modified by a group represented by Formula (2'):

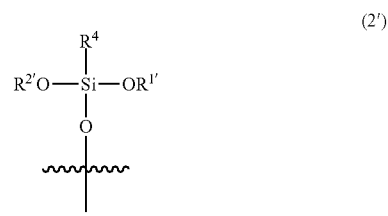

(2')

where, in Formula (2'), $R^6$ denotes an alkyl group having from 14 to 20 carbon atoms; R1' and $R^{2'}$ are the same as those described above; and the atomic bond indicated by the wavy line in the Formula bonds to the surface of the second nanodiamond particles.

13. A nanodiamond particle dispersion comprising nanodiamond particles dispersed in an organic solvent, wherein the organic solvent has an SP value not less than 8.0 $(cal/cm^3)^{1/2}$ and less than 10.0 $(cal/cm^3)^{1/2}$, the nanodiamond particles are dispersed with a particle diameter (D50) from 2 to 100 nm, and the nanodiamond particles have a structure including the surface modified by a group represented by Formula (1"):

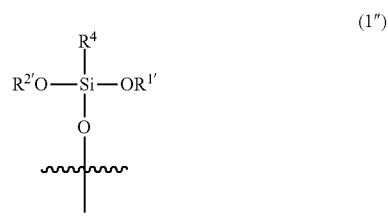

(1")

where, in Formula (1"), $R^4$ denotes an alkyl group having from 4 to 8 carbon atoms; R1' denotes a group represented by Formula (a), $R^{2'}$ denotes a hydrogen atom, an aliphatic hydrocarbon group having from 1 to 3 carbon atoms, or a group represented by Formula (a), and the atomic bond indicated by the wavy line in the Formula bonds to the surface of the nanodiamond particles:

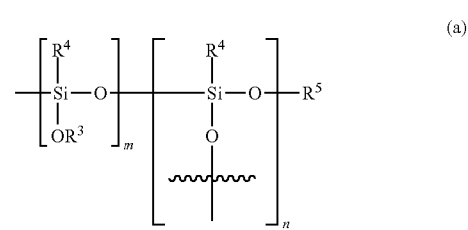

(a)

where, in Formula (a), $R^4$ is the same as described above, $R^3$ and $R^5$ may be the same or different and each denotes a hydrogen atom or an aliphatic hydrocarbon group having from 1 to 3 carbon atoms, m represents an integer of 0 or greater, n represents an integer greater than 0, an atomic bond extending to the left from a silicon atom bonds to an oxygen atom, and an atomic bond indicated by a wavy line bonds to the surface of the nanodiamond particle.

* * * * *